United States Patent [19]

Fowler

[11] Patent Number: 4,777,483
[45] Date of Patent: Oct. 11, 1988

[54] SOLID STATE ROTARY ENTRY CONTROL SYSTEM

[75] Inventor: Daniel L. Fowler, Kentwood, Mich.

[73] Assignee: Robertshaw Controls Company, Richmond, Va.

[21] Appl. No.: 811,520

[22] Filed: Dec. 20, 1985

Related U.S. Application Data

[62] Division of Ser. No. 433,684, Oct. 12, 1982, Pat. No. 4,568,927.

[51] Int. Cl.$^4$ .................. H01H 19/00; G09G 3/00
[52] U.S. Cl. .................. 340/706; 200/11 TW; 200/11 DA
[58] Field of Search ............ 340/753, 802, 672, 803, 340/706, 671, 364, 309.4, 825.56; 200/24, 155 R, 252, 11 TW, 11 R, 11 DA, 336; 338/162; 364/144, 146, 188

[56] References Cited

U.S. PATENT DOCUMENTS

| | | | |
|---|---|---|---|
| 2,886,661 | 5/1959 | Skelton et al. | 200/11 R |
| 2,932,733 | 4/1960 | Dawson | 340/364 |
| 2,976,104 | 3/1961 | Petersen | 340/364 |
| 3,053,256 | 9/1962 | Clavel | 200/252 |
| 3,550,157 | 12/1970 | Pfleger | 200/11 TW X |
| 3,558,874 | 1/1971 | Zielke | 200/11 TW |
| 4,071,745 | 1/1978 | Hall | 364/146 X |
| 4,163,879 | 8/1979 | Mayer et al. | 200/11 TW |
| 4,171,540 | 10/1979 | Arnold | 364/900 |
| 4,189,765 | 2/1980 | Kotanik et al. | 364/188 |
| 4,200,910 | 4/1980 | Hall | 364/146 X |
| 4,223,379 | 9/1980 | Simwe | 364/144 |
| 4,247,845 | 1/1987 | Schmidt et al. | 340/706 X |
| 4,275,464 | 6/1981 | Schmidt | 371/15 |
| 4,313,105 | 1/1982 | Ananthan et al. | 340/825.56 |
| 4,318,095 | 3/1982 | Fukuoka | 340/706 |
| 4,343,977 | 8/1982 | Koyama | 340/364 X |
| 4,365,289 | 12/1982 | Small et al. | 364/144 X |
| 4,390,965 | 6/1983 | Albert | 364/146 X |
| 4,399,335 | 8/1983 | House et al. | 200/11 R |
| 4,420,669 | 12/1983 | Scelf et al. | 340/706 X |
| 4,443,670 | 4/1984 | Nokamura et al. | 200/11 DA |
| 4,454,505 | 6/1984 | Harney et al. | 340/706 X |
| 4,591,694 | 5/1986 | Rose et al. | 200/11 R |

FOREIGN PATENT DOCUMENTS

| | | |
|---|---|---|
| 0049364 | 9/1981 | European Pat. Off. |
| 0050208 | 9/1981 | European Pat. Off. |
| 3214661 | 4/1982 | Fed. Rep. of Germany |
| 2001467 | 1/1979 | United Kingdom |
| 2059634 | 4/1981 | United Kingdom |

Primary Examiner—Donald J. Yusko
Assistant Examiner—Alvin Oberly
Attorney, Agent, or Firm—Candor, Candor & Tassone

[57] ABSTRACT

A solid state rotary entry control system for controlling appliances such as microwave ovens, dishwashers, washing machines, television sets and other appliances, the control system incorporating a first rotary entry means utilizing the angular displacement of a rotary switch to increment and decrement data, such as desired time, temperature or other data into a microprocessor based appliance control, the control system also incorporating a second rotary entry means for selecting, for example, a desired power level, such as a desired microwave oven magnetron power level, and also providing a power level bar graph display indicative of the power level selected by the user thereof.

4 Claims, 2 Drawing Sheets

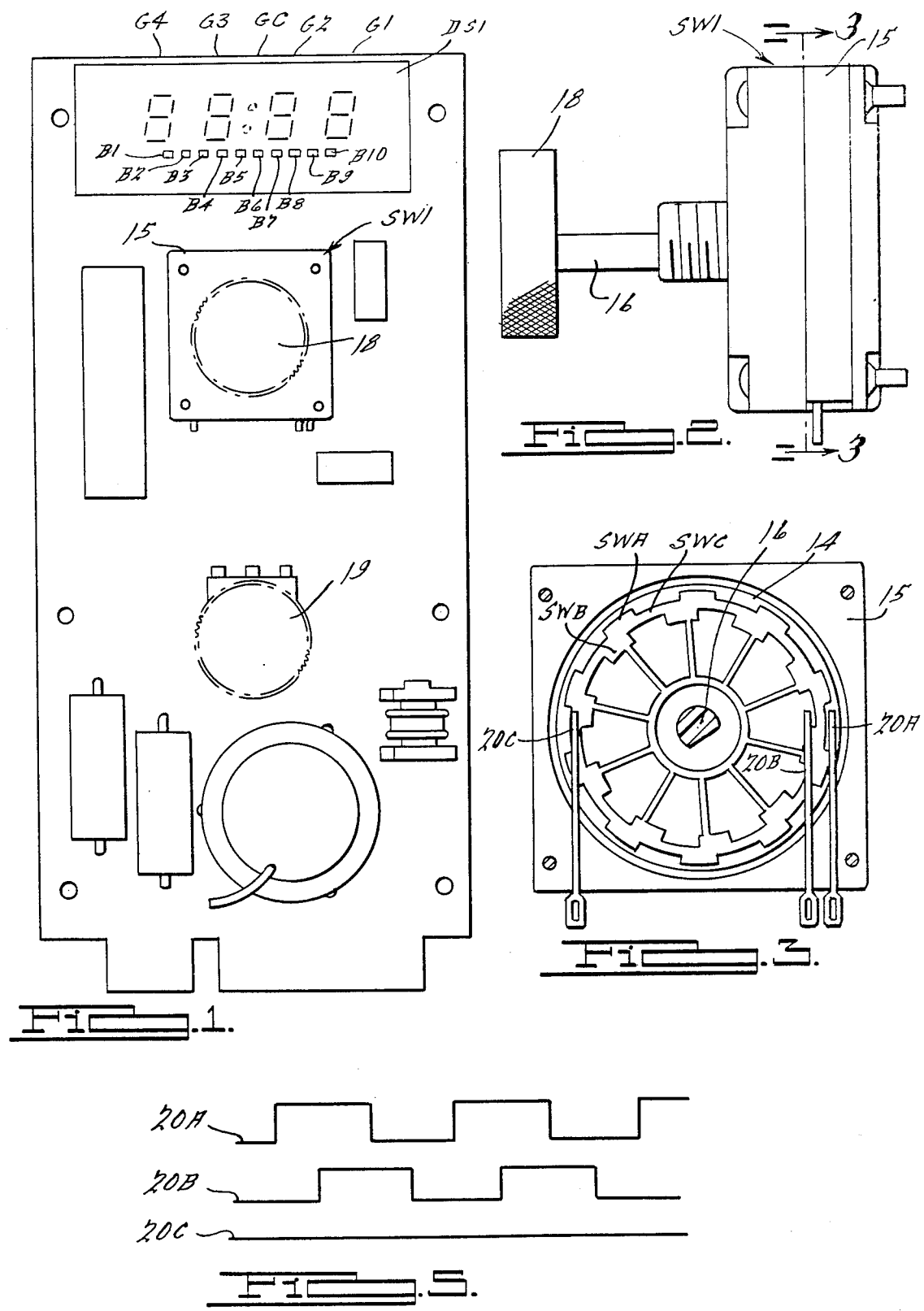

SOLID STATE ROTARY ENTRY CONTROL SYSTEM

CROSS REFERENCE TO RELATED APPLICATION

This application is a divisional patent application of its copending parent patent application, Ser. No. 433,684, filed Oct. 12, 1982, now U.S. Pat. No. 4,568,927.

BRIEF DESCRIPTION OF THE INVENTION

This invention relates to appliance controls, and, more particularly, to an improved solid state rotary entry control system for controlling appliances such as microwave ovens, dishwashers, washing machines, television sets and other appliances, the control system incorporating improved rotary entry means utilizing the angular displacement of a first shaft to increment and decrement data, such as desired time, temperature or other data, into a microprocessor based appliance control, the control system also incorporating rotary entry means for selecting a desired power level, such as a desired microwave oven magnetron power level, and also providing a power level bar graph display indicative of the power level selected by the user thereof.

Heretofore, microprocessor based electronic controls have been utilized for the purpose of controlling a wide variety of household appliances such as microwave ovens, dishwashers, washing machines, television sets and other appliances. Such microprocessor based appliance controls have become increasingly sophisticated as a result of the increasing versatility and cababilities of microprocessors which are programmed to perform a multitude of functions with integrated circuit components. The universal self-diagnosing appliance control disclosed in U.S. Pat. No. 4,275,464, issued June 23, 1981, to David J. Schmidt and assigned to the assignee of the present invention is typical of such sophisticated appliance controls. Appliance controls of the indicated character utilize relatively expensive cross point matrix push button keyboards to effect operation thereof, and many persons find such keyboards confusing to operate and difficult to comprehend.

An object of the present invention is to overcome disadvantages in prior appliance controls of the indicated character and to provide an improved solid state rotary entry control system which is particularly adapted for use with microprocessor based appliance controls, which may be easily understood and operated by the users thereof, and which enables rapid, precise, repeatable programming of an appliance such as a microwave oven, dishwasher, washing machine, television set or other appliance by the users thereof.

Another object of the present invention is to provide an improved solid state rotary entry control system incorporating improved means for selecting a desired power level for the appliance associated therewith.

Another object of the present invention is to provide an improved solid state rotary entry control system incorporating improved means for utilizing the angular displacement of a rotary shaft to increment and decrement data into a microprocessor based appliance control, the magnitude of the data increments and decrements being variable in proportion to the magnitude of the data currently stored in the microprocessor.

Another object of the present invention is to provide an improved solid state rotary entry control system incorporating improved means for providing a unique bar graph display indicative, for example, of a power level selected by the user thereof.

Another object of the present invention is to provide an improved solid state rotary entry control system that is economical to manufacture and assemble, durable, efficient and reliable in operation.

The above as well as other objects and advantages of the present invention will become apparent from the following description, the appended claims and the accompanying drawings.

BRIEF DESCRIPTION OF THE DRAWINGS

FIG. 1 is a front elevational view of a solid state rotary entry appliance control embodying the present invention, showing the same with the cover removed for clarity of illustration;

FIG. 2 is a side elevational view of a rotary switch embodied in the appliance control illustrated in FIG. 1;

FIG. 3 is a cross sectional view of the switch illustrated in FIG. 2, taken on the line 3—3 thereof;

FIG. 5 is a logic timing diagram illustrating the position code of the rotary switch embodied in the present invention.

DETAILED DESCRIPTION

Figure 4:
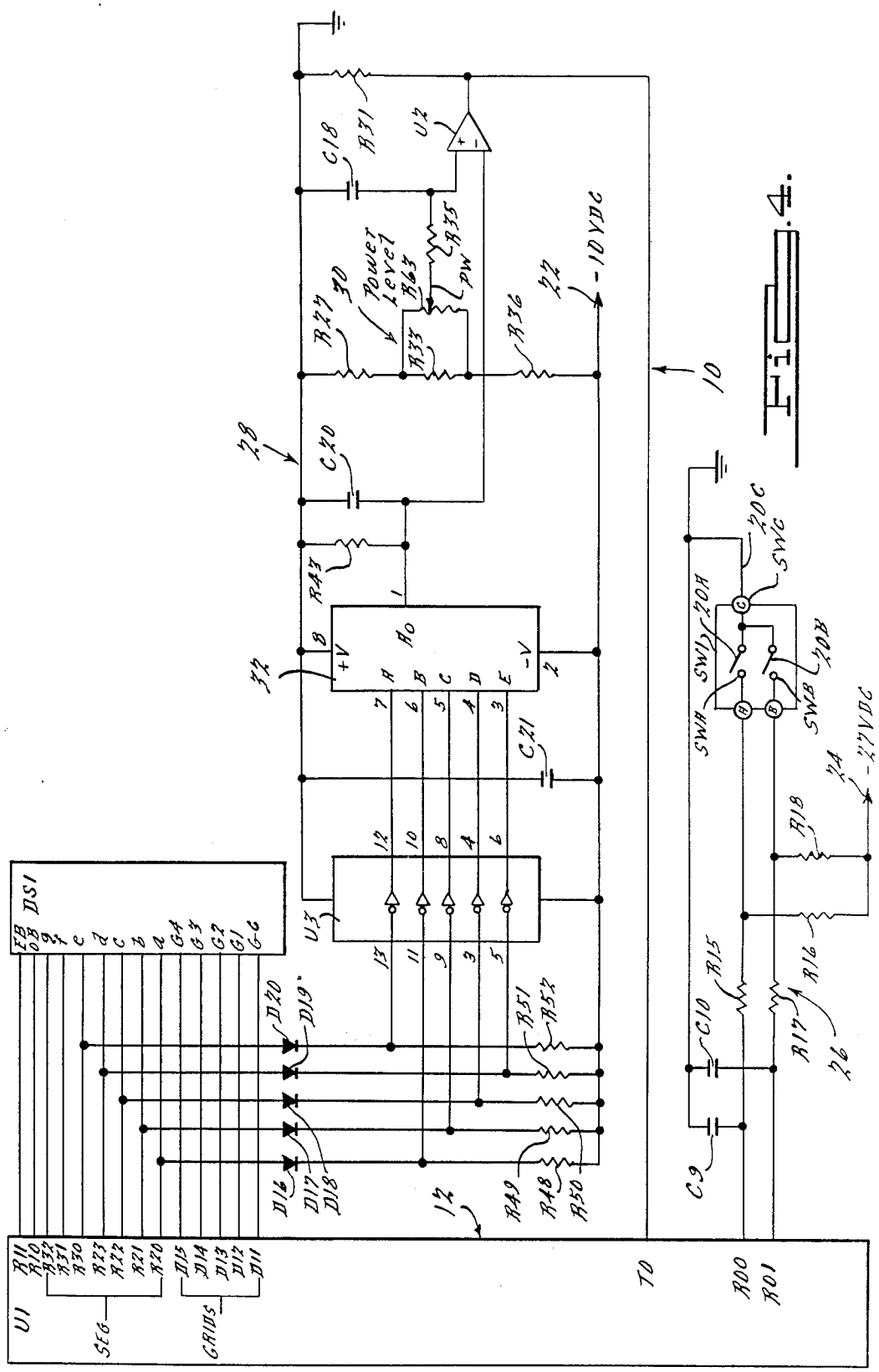
FIG. 4 is a schematic circuit diagram of the solid state rotary entry control system embodying the present invention, showing the same applied to a microprocessor based appliance control.

Referring to the drawings, a preferred embodiment of the present invention is illustrated therein and is comprised of a solid state rotary entry control system, generally designated 10, particularly adapted for use in controlling a microprocessor based appliance control, generally designated 12, only portions of which are illustrated so as to show the connection of the present invention therewith. The microprocessor based appliance control 12 includes a conventional microprocessor U1 which may be of any desired type and the control 12 may, for example, be of the type adapted to control a microwave oven, although it will be understood that the present invention is applicable to other uses. By way of example, solid state rotary entry control systems embodying the present invention may be applied to other microprocessor based appliance controls, such as microprocessor based controls for dishwashers, washing machines, dryers, television sets and other appliances.

The solid state rotary entry control system 10 includes a rotary switch SW1 which is utilized to increment and decrement data into the microprocessor U1. The rotary switch SW1 includes a circular disc 14 which is mounted for rotation in a housing 15, the disc 14 being fixed to a shaft 16 mounted for rotation in suitable bearings carried by the housing 15. An actuating knob 18 is fixed to the outer end of the shaft 16 to facilitate manual rotation of the shaft 16 and the disc 14. The rotary disc 14 is provided with a code pattern that can be uniquely decoded to determine whether or not the shaft 16 and the disc 14 are being angularly displaced in a clockwise or counterclockwise direction, the code pattern having a multiplicity of outputs for each 360 degrees of rotation of the shaft 16. By way of example, the code pattern may provide for forty distinct codes for each 360 degree rotation of the shaft 16 of the rotary switch SW1. In the embodiment of the invention illustrated, the rotary switch SW1 is provided with a code pattern comprised of two concentric, segmented and electrically interconnected tracks SWA and SWB and a concentric continuous track SWC, each of the concentric tracks SWA and SWB having a fifty percent duty cycle of contact material versus insulation material. The pattern of the tracks is divided into four reference areas as a repeating type pattern with a total of forty reference areas in the embodiment of the invention illustrated. The output of each track SWA and SWB during angular rotation thereof provides a code pattern having two reference areas of electrically conducting material followed by two reference areas of nonconducting or insulating material. Moreover, the two tracks SWA and SWB are related to each other in that the track SWA is offset from the track SWB by one reference area. With such a construction, if the code pattern is angularly moved, for example, in a clockwise direction as viewed in FIG. 3, first one track (SWA) will conduct while the second track (SWB) is in a nonconducting condition, then both tracks SWA and SWB will conduct after which the first track SWA discontinues conducting while the second track SWB continues to conduct. The pattern then moves to a position where neither track SWA nor track SWB conducts. The pattern then repeats itself for nine more phases in the embodiment of the invention illustrated.

It will be understood that the number of incrementing phases for each complete rotation of the shaft 16 is dependent on the number of on and off patterns incorporated in 360 degrees. For example, if there are ten on and off patterns for each 360 degree rotation of the pattern, there is a four to one multiplication and consequently there are forty distinct codes for each complete 360 degree rotation of the pattern. The switch SW1 includes wiper contacts 20A, 20B and 20C, the wiper contacts 20A and 20B being adapted to contact the code patterns provided by the tracks SWA and SWB while the wiper contact 20C is adapted to contact the concentric continuous track SWC and is connected to ground throughout the rotation of the track patterns. Since the code patterns are offset, the wiper contacts provide means for determining the direction of rotation of the shaft 16 depending upon whether the first track SWA or the second track SWB first changes from a conducting to a nonconducting condition. As will be discussed hereinafter in greater detail, the code pattern emitted by the switch SW1 is supplied to the microprocessor U1 in the form of a digital code to increment and decrement data, such as time and temperature, into the microprocessor U1.

Referring to FIG. 4, the solid state rotary entry control system 10 is adapted to be connected to conventional power supplies, such as the minus ten volt DC power supply 22 and the minus 27 volt DC power supply 24 supplied by any desired or conventional means incorporated in the appliance control 12. The system 10 is comprised of a rotary switch circuit, generally designated 26, which includes the rotary switch SW1. The rotary switch circuit 26 also includes resistors R15, R16, R17, and R18; and capacitors C9 and C10, the various components of the rotary switch circuit 26 all being electrically connected by suitable conductors, as illustrated in FIG. 4, and as will be described hereinafter in greater detail.

In addition, the system 10 includes a power level circuit, generally designated 28, comprised of a conventional rotary potentiometer 30 having an actuating knob 19, a comparator U2, a CMOS inverter U3, an R/2R ladder network 32, capacitors C18, C20 and C21, resistors R27, R31, R33, R35, R36, R43, R48, R49, R50, R51 and R52, the variable potentiometer resistor R63, and diodes D16, D17, D18, D19, D20. The various components of the power level circuit 28 are also all electrically connected by suitable conductors as illustrated in FIG. 4 and as will be described hereinafter in greater detail.

In the embodiment of the invention illustrated, the rotary potentiometer 30 is scaled so that the D to A converter, comprised of the CMOS inverter U3, the R/2R ladder network 32, the resistor R43 and the capacitor C20, reads eleven steps or increments, that is to say, a zero percent to one hundred percent of rotation in ten percent increments. The rotary potentiometer 30 is a linear potentiometer, and a particular angular position of the rotary potentiometer corresponds to a specific step on the D to A converter.

The microprocessor U1 is programmed to supply signals to a multiplexed vacuum fluorescent Arabic numeral display DS1, the display also including ten bars B1 through B10 in a horizontal pattern across the bottom of the display as illustrated in FIG. 1, the percentage of bars displayed corresponding to the percentage of rotation of the rotary potentiometer 30 which controls the power level of a high energy component of the appliance being controlled, such as the power level of the magnetron (not shown) of a microwave oven. Each increment of rotation of the rotary potentiometer will light a successive bar on the display whereby the display reading corresponds with the angular position of the rotary potentiometer 30, and at the same time a corresponding duty cycle is entered for the magnetron corresponding to the percentage displayed on the bar graph. The magnetron is preferably duty cycled on and off to a predetermined time base such as, for example, fifteen seconds. That is to say, with a fifty percent duty cycle, the magnetron is energized for approximately 7.5 seconds and deenergized for approximately 7.5 seconds, suitable provisions being made to compensate for magnetron warm up time.

In general, the rotary potentiometer 30 is scaled to match the D to A converter by the resistors R27, R33 and R36. The junction point or node between the resistors R27 and R33 corresponds to step number eleven of the D to A converter, and the voltage junction point or node of the resistors R33 and R36 corresponds to the D to A converter step number one. Since the potentiometer wiper PW is moved in a linear displacement angular motion, all of the voltage steps between step number one and step number eleven can be adjusted for. The potentiometer wiper PW is fed into the positive input of the comparator U2. The negative input on the comparator U2 is fed from the D to A converter, the D to A converter being a staircase generator, and the staircase that emanates from the D to A converter is digitally encoded. Digital step number one is output from the microprocessor U1, and the ladder network 32 will provide a corresponding analog voltage that corresponds to a digital step number one. When the potentiometer wiper PW of the rotary potentiometer is at a position that compares in an analog fashion to the ladder step for number one, a comparison is provided through the comparator U2. The microprocessor U1 is programmed to send out digital codes and to compare these codes to the analog position of the rotary potentiometer wiper PW. The microprocessor U1 is programmed to determine where the potentiometer wiper PW is located in any of the eleven positions or steps on the wiper of the rotary potentiometer 30. Since the microprocessor U1 is sending out a predetermined code and is programmed to discriminate as to where the wiper of the rotary potentiometer is located, the microprocessor U1 utilizes such information and presents it as a bar graph on the display DS1.

In the operation of the system 10, as the pulses emanating from the switch SW1 are sent into the microprocessor U1, inputs R00 and R01, the microprocessor examines the states of two inputs R00 and R01 and analyzes those states based on the previous reading that the microprocessor did on those two inputs. Based on the current state versus the last state that was read by the microprocessor on the inputs R00 and R01, the microprocessor determines whether the rotary switch SW1 was operated in a clockwise direction or a counterclockwise direction. The manner in which the states change and the manner in which the microprocessor interprets the change of states of the inputs R00 and R01 is as follows: the input R00 is connected to the switch contact 20A while the input R01 is connected to the switch contact 20B. If the rotary disc 14 is being operated in a clockwise direction, as viewed in FIG. 3, then the logic state of the contact 20A will change to a new state prior to a change of the logic state of the contact 20B. In other words, if the contact 20A goes positive, then contact 20B will go positive in the next state after which contact 20A will go back in the negative state, and in the next position the contact 20B will go back to the negative state, there being a repetitive operation after every four logic state changes. If the disc 14 is being rotated in a counterclockwise direction, then the contact 20B changes its logic state before the contact 20A changes its logic state. That is to say, if both states of the contacts 20A and 20B are negative, then contact 20B will go positive after which the contact 20A will go positive. In the next state, the contact 20B will go negative after which the contact 20A will go negative. In summary, in a clockwise direction, the contact 20A's logic state will lead the contact 20B's logic state. In the counterclockwise direction, the contact 20B's logic state will lead the contact 20A's logic state. The pattern of the successive conducting and nonconducting states of the the contacts 20A and 20B and the continuous conductivity of the contact 20C is illustrated in FIG. 5 of the drawings. It will be understood that it is not critical as to which track SWA and SWB and the associated contacts 20A and 20B leads or follows, it being merely necessary that one track lead or follow the other track.

As previously mentioned, the signals coming into the inputs R00 and R01 are analyzed by the microprocessor U1, and the microprocessor utilizes such information to control the time and/or temperature of operation of the associated appliance. In addition, the microprocessor U1 interfaces with the display DS1 which, as previously mentioned, is a multiplexed vacuum florescent Arabic numeral display. The display DS1 includes five digit grids, four of which have conventional seven segment Arabic numeral displays which may be utilized, for example, to form a FIG. 8 in the conventional manner. The other grid is a colon grid disposed between the second and fourth numeral displays. In addition, the display DS1 includes the bar graph segments B1 through B10 disposed below the numerals in the embodiment of the invention illustrated. With such a construction, the display DS1 is utilized to display the time or temperature to the user of the appliance and the display is also utilized to display a bar graph indicative, for example, of a power level selected by the user of the appliance.

As previously mentioned, the rotary switch SW1 has three terminals 20A, 20B and 20C, the common terminal 20C being connected to ground of the control, which is zero volts DC. The switch terminal 20A is connected to the pull down resistor R16, the other side of the resistor R16 being connected to the source 24 of minus 27 volts DC. The switch terminal 20A is also connected to the resistor R15, the other side of the resistor R15 being connected to the input port R00 of the microprocessor U1. As shown in FIG. 4, the input port R00 is also connected to one side of the capacitor C9 while the other side of the capacitor C9 is tied back to ground which is zero volts DC. The contact 20A, when it is open, then sees a potential of minus 27 volts DC which is derived through the pull down resistor R16 that is tied to the source 24 of minus 27 volts DC. The minus 27 volts DC at the contact 20A is fed through the resistor R15 to the input port R00 of the microprocessor U1. The resistor R15 and the capacitor C9 act as an RC filter that is used to filter out transients. The RC filter comprised of the resistor R15 and the capacitor C9 is also used to filter out switch bounce which is caused by the mechanics of the switch oscillating from the open to closed state and the closed to open state. The amount of filtering that the resistor R15 and capacitor C9 provides must be less than the mechanical square wave generation provided by a person rotating the switch SW1 as illustrated in FIG. 5 of the drawings, so that the square wave pulses can be sensed at the input R00 of the microprocessor U1. It will be understood that the RC filter comprised of the resistor R15 and the capacitor C9 only shapes the wave form rather than totally filtering it out. The switch terminal 20B interfaces to the resistors R17 and R18 at one point, the other side of the resistor R18 being connected to the source 24 of minus 27 volts DC, the resistor R18 being a pull down resistor for the switch contact 20B. The resistor R17 and the capacitor C10 also provide an input filter network for the switch contact 20B in the same manner that the resistor R15 and the capacitor C9 provide an RC filter for the switch contact 20A. When the switch contact 20B is open, minus 27 volts DC is provided on the switch contact 20B and when the switch contact 20B is closed, zero volts DC is connected to the switch contact 20B. These logic levels are then sent through the resistor R17 to the input port R01 of the microprocessor U1. The terminals 20A and 20B thus provide logic states that vary between zero volts DC and minus 27 volts DC, and the pattern that is generated on the terminals 20A and 20B as the tracks SWA and SWB are rotated is fed to the input ports R00 and R01 of the microprocessor U1. The microprocessor U1, in turn, analyzes these logic states and determines whether the switch is stationary or whether it has been rotated in a clockwise or counterclockwise direction. Such information is then utilized to increment or decrement the time or temperature for operating the associated appliance, the time or temperature also being displayed on the display DS1. The scanning rate of the inputs R00 and R01 is such that the microprocessor U1 will monitor the rotation of the rotary switch SW1 even if a person rotates the switch very rapidly. In the event that the microprocessor U1 does miss state changes, which is a possibility if a person rotates the switch SW1 extremely rapidly so that the RC filter comprised of the resisto R15 and the capacitor C9 for the terminal 20A completely filters out the switch signals, the logic inside of the microprocessor U1 simply ignores the inputs to the inputs R00 and R01 and maintains the previous reading.

As previously mentioned, the microprocessor U1 analyzes the signals emitted from the rotary switch and utilizes such information to control the entry of time and/or temperature data which is displayed by the display DS1. The magnitude of the time data increments and decrements is variable and proportional to the magnitude of the data currently displayed and stored in the microprocessor. For example, in the embodiment of the invention illustrated, the magnitude of the time data increments and decrements is varied in accordance with the following table:

| CURRENT VALUE OF TIME DATA | TIME DATE INCREMENTS/DECREMENTS |
| --- | --- |
| 00:00 through 02:00 | 00:05 |
| 02:00 through 10:00 | 00:10 |
| 10:00 through 20:00 | 00:30 |
| 20:00 through 99:00 | 01:00 |

On the other hand, in the embodiment of the invention illustrated, the magnitude of the temperature data increments and decrements is preferably constant, as for example, increments and decrements of five degrees F from 100 degrees F. through 190 degrees F.

In the operation of the power level circuit 28, the power level position is established by the rotary potentiometer R63 and the resistor network comprised of the resistors R27, R33 and R36. The rotary potentiometer R63 is in parallel with the resistor R33. The resistor network comprised of the resistors R27, R33 and R36 is used to establish the voltages of the two end stops of the rotary potentiometer, that is the full clockwise position and the full counterclockwise position. By establishing these voltages, the potentiometer is then scaled to correspond to a specific step of the D to A converter for a full counterclockwise position which corresponds to a voltage level that is used as the timer position on the potentiometer input while the full clockwise position has another distinct voltage that corresponds to one hundred percent power level. The full counterclockwise position of the potentiometer then provides a voltage that is less than the step of the D to A converter that corresponds to the timer input while the voltage at the full clockwise position is greater than one hundred percent of the power level. Thus, with the potentiometer in the full counterclockwise position, the timer mode may be set through the rotary switch SW1. With the rotary potentiometer in the full counterclockwise position, the magnetron does not turn on and all of the high energy circuits are inhibited.

As the rotary potentiometer is rotated in a clockwise direction, the setting of the power level of the magnetron is initiated. There are eleven power levels ranging from zero through one hundred percent in ten percent increments, that is to say, there is a zero level, a ten percent level, a twenty percent level, on through to a one hundred percent level providing eleven distinct settings or steps. These levels are determined by the analog voltage on the wiper PW of the rotary potentiometer R63 which is fed into the positive input of the comparator U2. That analog level is compared to the D to A converter's staircase which is fed to the negative input of the comparator U2 from the ladder network 32, pin 1. The outputs generated by the microprocessor U1 provide the address that is fed to the CMOS inverter U3. The address emitting from the CMOS inverter U3 to the ladder network 32 in turn generates the staircase steps. The microprocessor U1 is aware of the address that it is generating and the comparator U2 compares the D to A level of that address to the level of the wiper PW of the power level potentiometer 30. When the comparator U2 logic level indicates that the D to A step is greater than the power level position, the microprocessor utilizes such information to determine the power level. After the microprocessor U1 determines what the power level is, then the display sequence is initiated utilizing the output ports R10 and R11 of the microprocessor U1 which are connected to the odd and even bars of the display. The display is then strobed so that the microprocessor presents the information as a user enunciation of the power level that was selected. A continuous readout of the position of the power level potentiometer 30 is always presented whenever the microprocessor is in the mode that presents such information to the user.

It will be understood that all of the odd bars B1, B3, B5, B7 and B9 are connected together and that all of the even bars B2, B4, B6, B8 and B10 are connected together. There are two segments in each of the grids of the display, and the odd bars and even bars for a particular grid are lighted in a sequential manner. For example, assuming that there is a fifty percent power level, the odd and even bars of grid G4 of the display, (the left grid of the display as viewed in FIG. 1) the odd and even bars of grid G3 of the display, and the odd bar of the colon grid Gc of the display would be lighted. These bars are lighted sequentially as the display is strobed, the grids of the display being strobed from left to right. As previously mentioned, the display is multiplexed so that the time and temperature as well as the bar graph may be displayed, the material of the display segments having a persistence such that the eye of a user thereof perceives the display as glowing continuously.

The biasing network for the rotary potentiometer starts at signal ground, and from signal ground, one side is tied to the resistor R27, the other side of the resistor R27 being tied to one side of the resistor R33. The other side of the resistor R33 ties to one side of the resistor R36 and the other side of the resistor R36 ties to the source of potential 22 which is minus ten volts DC. The potentiometer resistance R63 is in parallel with the resistor R33. The wiper PW of the potentiometer 30 is connected to one side of the resistor R35 which is part of an RC filter. The other side of the resistor R35 is connected to the positive pin of the comparator U2. Such side of the resistor R35 is also connected to one side of the capacitor C18 while the other side of the capacitor C18 is connected to signal ground. Thus the resistor R35 and the capacitor C18 form an RC network filter that prevents transients, such as static discharge, from affecting the comparator U2. Such RC network does not attenuate the DC level that is on the wiper PW of the rotary potentiometer. As previously mentioned, the resistors R27, R33 and R36 are used to scale the end points of the potentiometer resistance R63 whereby such scaling provides eleven positions on the potentiometer that compare to the steps of the D to A output of the ladder network. The D to A output is generated by the ladder network 32, output pin 1. The ladder network 32 generates a staircase that is binary weighted, the binary address being generated by the microprocessor U1.

The outputs R20, R21, R22, R23 and R30 of the microprocessor U1 provide a binary address generated by the microprocessor U1. This information is interfaced to the CMOS inverter U3 through the diodes D16, D17, D18, D19 and D20, such diodes being utilized as part of the level transition. It should be noted that the cathode sides of the diodes D16, D17, D18, D19 and D20 are tied to the pull down resistors R48, R49, R50, R51 and R52, respectively, the pull down resistors in turn being connected to the source 22 of minus ten volts DC. Thus, if the microprocessor is emitting minus 27 volts DC, the diodes block the minus 27 volts DC from the inputs of the CMOS inverter U3. The resistors R48 through R52 pull the inputs of the CMOS inverter U3 down to a minus ten volts DC whereby a level translation is provided from logic that is from zero to minus 27 volts DC to logic that is from zero to minus ten volts DC.

The binary address from the CMOS inverter U3 is interfaced to the ladder network 32. The CMOS inverter U3 sources and sinks the current to the positive and negative potential of the power supply between zero volts DC and minus ten volts DC. The ladder network inputs A through E sum the currents from the CMOS inverter U3 and generate an analog staircase which is proportional to the binary address from the CMOS inverter U3. This output is generated at pin 1 of the ladder network 32. The output of the ladder network 32 then is interfaced to the negative input of the comparator U2. This analog staircase is then compared to the analog potential coming from the wiper PW of the rotary potentiometer 30. The microprocessor U1 senses the output of the comparator U2 and since the microprocessor U1 knows what the potential of the analog staircase is, the microprocessor U1 is able to determine what the potential of the wiper PW of the power level potentimeter 30 is.

The resistor R43 is a bias resistor that is used to adjust the slope of the analog staircase while the capacitor C20 is a filter capacitor that is used to filter out any switching transients that are caused by switching from address to address, i.e., filtering the output of the ladder network 32. The capacitor C21 is a bypass capacitor that is across the minus ten volt power supply and is provided for noise unity purposes.

An identification of and/or typical values for the components of the system 10, which are described hereinabove, are as follows:

U1 Microprocessor
U2 Comparator
U3 CMOS Inverter
32 R/2R Ladder Network
C9 Capacitor, 0.01 mfd
C10 Capacitor, 0.01 mfd
C18 Capacitor, 0.01 mfd
C20 Capacitor, 180 pF
C21 Capacitor, 0.047 mfd
R15 Resistor, 47K ohms
R16 Resistor, 12K ohms
R17 Resistor, 47K ohms
R18 Resistor, 12K ohms
R27 Resistor, 2.2K ohms
R31 Resistor, 22K ohms
R33 Resistor, 5.1K ohms
R35 Resistor, 47K ohms
R36 Resistor, 1.6K ohms
R43 Resistor, 560K ohms
R48 Resistor, 47K ohms
R49 Resistor, 47K ohms
R50 Resistor, 47K ohms
R51 Resistor, 47K ohms
R52 REsistor, 47K ohms
R63 Rotary Potentiometer, 50K ohms
D16 Diode, 1N4148
D17 Diode, 1N4148
D18 Diode, 1N4148
D19 Diode, 1N4148
D20 Diode, 1N4148
DS1 Vacuum Fluorescent Display
SW1 Rotary Switch Shaft Encoder It will be understood, however, that these identifications and values may be varied depending upon the particular application of the principles of the present invention.

While a preferred embodiment of the invention has been illustrated and described, it will be understood that various changes and modifications may be made without departing from the spirit of the invention. For example, more than one rotary switch may be utilized to increment and decrement desired data into the microprocessor based appliance control.

What is claimed is:

1. A rotary entry control system for an appliance control that includes a microprocessor and multiplexed display means electrically connected to output means of said microprocessor and thereby being controlled by said microprocessor, the control system comprising, in combination, rotary entry logic encoding means electrically connected to input means of said microprocessor for entering first desired data into said microporcessor, said microprocessor having means for operating said display means to display the magnitude of said first desired data as said data is being entered into said microprocessor by said rotary entry logic encoding means, said rotary entry logic encoding means comprising a manually rotatable switch means that is adapted to be rotated in uniform increments of movement by an operator through a plurality of serially disposed ranges in one rotational direction, said means of said microprocessor causing a uniform change in said magnitude of the data display by said display means for each said increment of movement of said rotatable switch means in said one direction in each said range with each uniform change in magnitude for its respective range being a different amount than the amount of uniform change in the range adjacent thereto, said control system also including additional means electrically connected to said microporcessor for entering additional data into said microprocessor, said rotary entry logic encoding means comprising an electrically insulative member having two like and circular and uniformly segmented conductive tracks disposed thereon in concentric and in offset relation relative to each other whereby each segmented track has a fifty percent duty cycle of conductive material versus insulative material and having a circular and continuous conductive track disposed thereon in concentric relation to said segmented tracks, each said segmented track having a like repeating code pattern of two reference areas of said conductive material followed by two reference areas of said insulative material with each reference area being spaced from the next adjacent reference area by a like distance, said tracks being offset relative to each other by one reference area, contact means cooperating with said tracks, and means adapted to be operated by an operator for causing relative rotational movement between said insulative member and said contact means for entering said first desired data into said microprocessor.

2. The combination as set forth in claim 1, said display means including indicia means for indicating the additional data entered into said microprocessor.

3. The combination as set forth in claim 1, said appliance being a microwave oven, said first desired data being a selected time period for operating said oven and said additional data being a selected power level of the energy component of said oven.

4. The combination as set forth in claim 3, each uniform increment of movement of the rotary entry logic encoding means by said operator causing a uniform change of approximately 5 seconds in the display means when the indicated selected time period is in the range between 00:00 and 02:00, each uniform increment of movement of the rotary entry logic encoding means by said operator causing a uniform change of approxiamtely 10 seconds in the display means when the indicated selected time period is in the range between 02:00 and 10:00, each increment of movement of the rotary entry logic encoding means by the operator causing a uniform change of approximately 30 seconds in the display means when the indicated selected time period is in the range between 10:00 and 20:00, and each increment of movement of the rotary entry logic encoding means by the operator causing a uniform change of approximately 1 minute in the display means when the indicated selected time period is in the range between 20:00 and 99:00.

* * * * *